United States Patent
Oniki et al.

(10) Patent No.: US 10,062,153 B2
(45) Date of Patent: Aug. 28, 2018

(54) IMAGE PROCESSING APPARATUS, IMAGE PICKUP APPARATUS, IMAGE PROCESSING METHOD, AND STORAGE MEDIUM

(71) Applicant: CANON KABUSHIKI KAISHA, Tokyo (JP)

(72) Inventors: Takashi Oniki, Utsunomiya (JP); Koshi Hatakeyama, Tokyo (JP); Takayoshi Yokoyama, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 34 days.

(21) Appl. No.: 15/152,869

(22) Filed: May 12, 2016

(65) Prior Publication Data

US 2016/0343111 A1    Nov. 24, 2016

(30) Foreign Application Priority Data

May 19, 2015    (JP) .................. 2015-102100

(51) Int. Cl.
H04N 5/232    (2006.01)
G06T 5/20    (2006.01)
G06T 5/00    (2006.01)

(52) U.S. Cl.
CPC ............ *G06T 5/20* (2013.01); *G06T 5/004* (2013.01); *G06T 2207/20008* (2013.01)

(58) Field of Classification Search
CPC .................................. H04N 5/232229
USPC ........................................ 348/241
See application file for complete search history.

(56) References Cited

U.S. PATENT DOCUMENTS

| 8,391,637 B2 | 3/2013 | Kinoshita | |
| 2011/0205402 A1* | 8/2011 | Kumar et al. | H04N 5/262 348/240.3 |
| 2015/0097993 A1* | 4/2015 | Oniki | G06T 5/004 348/241 |

FOREIGN PATENT DOCUMENTS

JP    2010081263 A    4/2010

OTHER PUBLICATIONS

Office Action issued in Japanese application No. JP2015-102100, dated Sep. 13, 2016.

* cited by examiner

*Primary Examiner* — Joel Fosselman
(74) *Attorney, Agent, or Firm* — Rossi, Kimms & McDowell LLP

(57) ABSTRACT

An image processing apparatus acquires an input image generated by image pickup via an optical system, and perform unsharp mask processing for the input image using a filter generated based on information of a PSF of the optical system. The filter is generated based on an unsharp mask used for the unsharp mask processing, and includes two-dimensional data having filter coefficients that are arranged rotationally asymmetrically with respect to a filter coefficient corresponding to a target pixel in the input image in convoluting the filter with the input image. A peak position or a center of gravity position of the unsharp mask accords with a position of the filter coefficient corresponding to the target pixel in the filter.

11 Claims, 13 Drawing Sheets

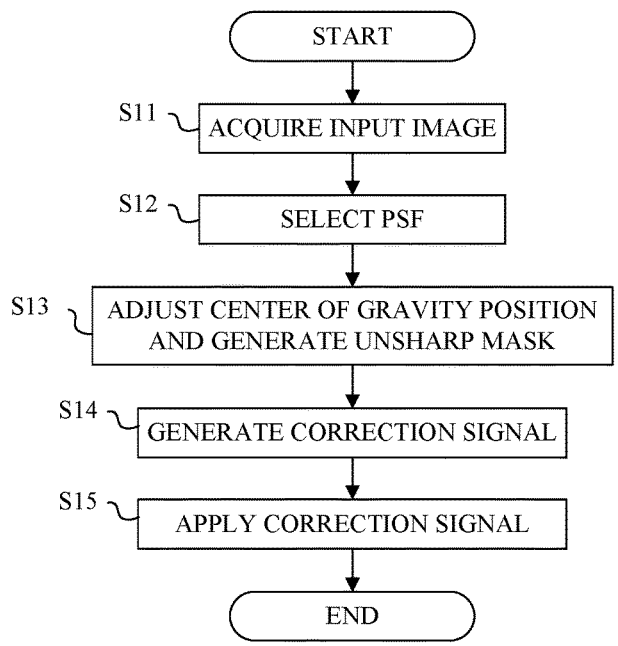
FIG. 2
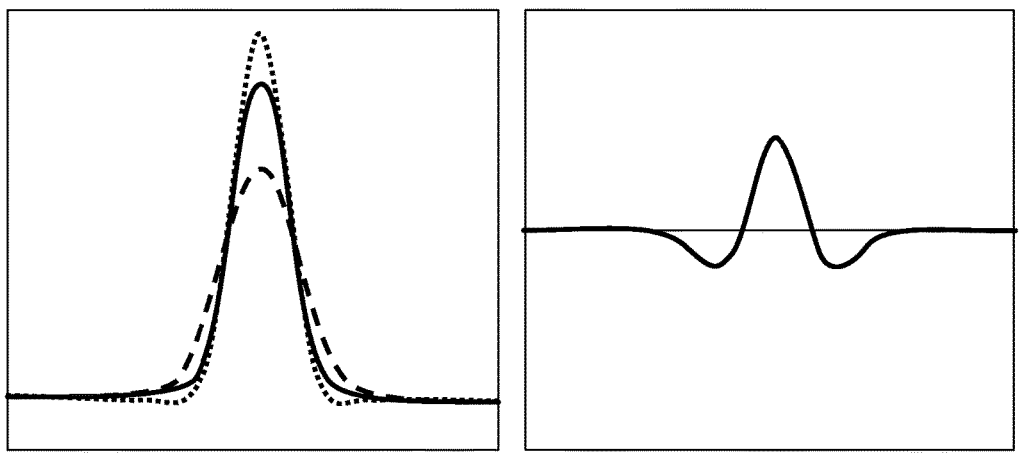
FIG. 3A                    FIG. 3B

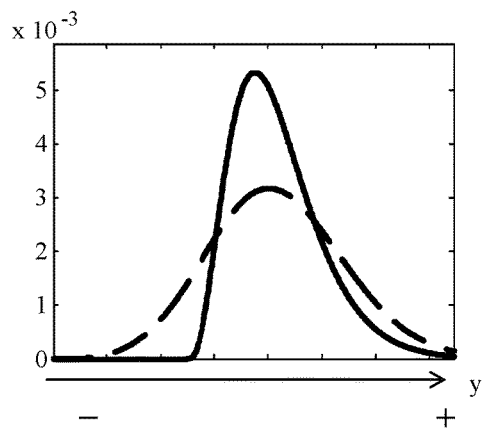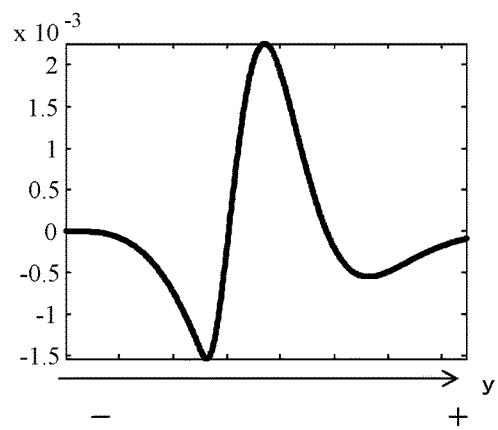
FIG. 5A                FIG. 5B
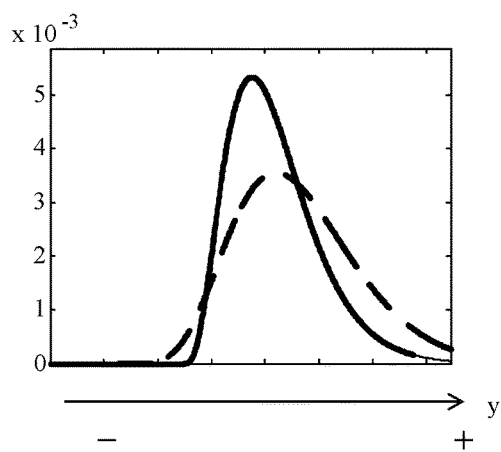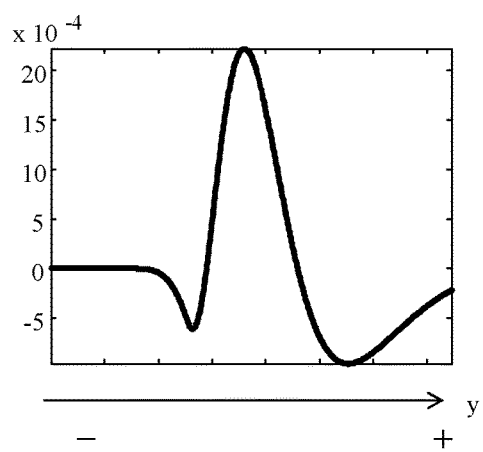
FIG. 5C                FIG. 5D

| G1 | B  | G1 | B  |
|----|----|----|----|
| R  | G2 | R  | G2 |
| G1 | B  | G1 | B  |
| R  | G2 | R  | G2 |

FIG. 8

IMAGE PROCESSING APPARATUS, IMAGE PICKUP APPARATUS, IMAGE PROCESSING METHOD, AND STORAGE MEDIUM

BACKGROUND OF THE INVENTION

Field of the Invention

The present invention relates to image processing technology for sharpening processing of an image generated by an image pickup apparatus, such as a digital camera.

Description of the Related Art

The unsharp mask processing (sharpening processing) is known as processing of improving the sharpness of an (input) image generated through capturing by an image pickup apparatus, such as a digital camera. The unsharp mask processing realizes sharpening by adding to the input image, data of a difference between an original input image and a blurred image made by applying an unsharp mask to the input image. The unsharp mask uses an image blurring filter, such as a smoothing filter, and an image area having a larger difference between the input image and the blurred image can be more effectively sharpened.

Japanese Patent Laid-Open No. ("JP") 2010-81263 discloses a method for applying an asymmetrical one-dimensional filter to a pixel signal row arranged in an image height direction (meridional direction) and for correcting a false color and unnecessary coloring caused by a point spread function ("PSF") of an optical system.

The conventional unsharp mask processing uses a rotationally symmetrical filter for the unsharp mask. Thus, it cannot correctly sharpen an input image that was deteriorated by a PSF having a complicated shape, such as an asymmetrical aberration and a sagittal halo. This means that an attempt to correct an aberration in an azimuth direction in which a large amount of aberration occurs causes undershoot in an azimuth direction in which a small amount of aberration occurs, and an attempt to restrain the undershoot cannot fully correct the aberration.

The method disclosed in JP 2010-81263 considers the asymmetry and changes in the image height of the PSF but these changes are those in the image height direction of the PSF. The correction filter used for this method is also a one-dimensional filter, and cannot improve the asymmetry in a direction other than the image height direction. Moreover, the method disclosed in JP 2010-81263 adjusts the asymmetry of the filter by the number of minus tap coefficients for the filter. When the actual asymmetry is different from the blur caused by the PSF of the optical system, sufficient sharpening is unavailable even in the image height direction.

In the rotationally symmetrical filter, the center position of the filter accords with the center of gravity position and the peak position of the coefficients of the filter. However, this is not always the case in the rotationally asymmetrical filter. When the relationship among them changes, the sharpening effect may reduce or a problem may occur.

SUMMARY OF THE INVENTION

The present invention provides an image processing apparatus, an image pickup apparatus, and an image processing method which can provide highly precise sharpening processing using a filter that is properly adjusted to an asymmetrical PSF.

An image processing apparatus according to one aspect of the present invention includes an acquirer configured to acquire an input image generated by image pickup via an optical system, and a processor configured to perform unsharp mask processing for the input image using a filter generated based on information of a point spread function of the optical system corresponding to an image pickup condition of the optical system in generating the input image. The filter is generated based on an unsharp mask used for the unsharp mask processing, and includes two-dimensional data having filter coefficients that are arranged rotationally asymmetrically with respect to a filter coefficient corresponding to a target pixel in the input image in convoluting the filter with the input image. A peak position or a center of gravity position of the unsharp mask accords with a position of the filter coefficient corresponding to the target pixel in the filter.

Further features of the present invention will become apparent from the following description of exemplary embodiments with reference to the attached drawings.

BRIEF DESCRIPTION OF THE DRAWINGS

FIG. 2 is a flowchart illustrating image processing according to the first embodiment.

FIGS. 3A and 3B are views of unsharp mask processing (sharpening processing) according to the first embodiment.

FIGS. 5A-5D are views illustrating unsharp mask processing using a rotationally symmetrical unsharp mask and unsharp mask processing using an rotationally asymmetrical unsharp mask.

FIG. 8 is a view illustrating a Bayer arrangement.

DESCRIPTION OF THE EMBODIMENTS

Figure 1:
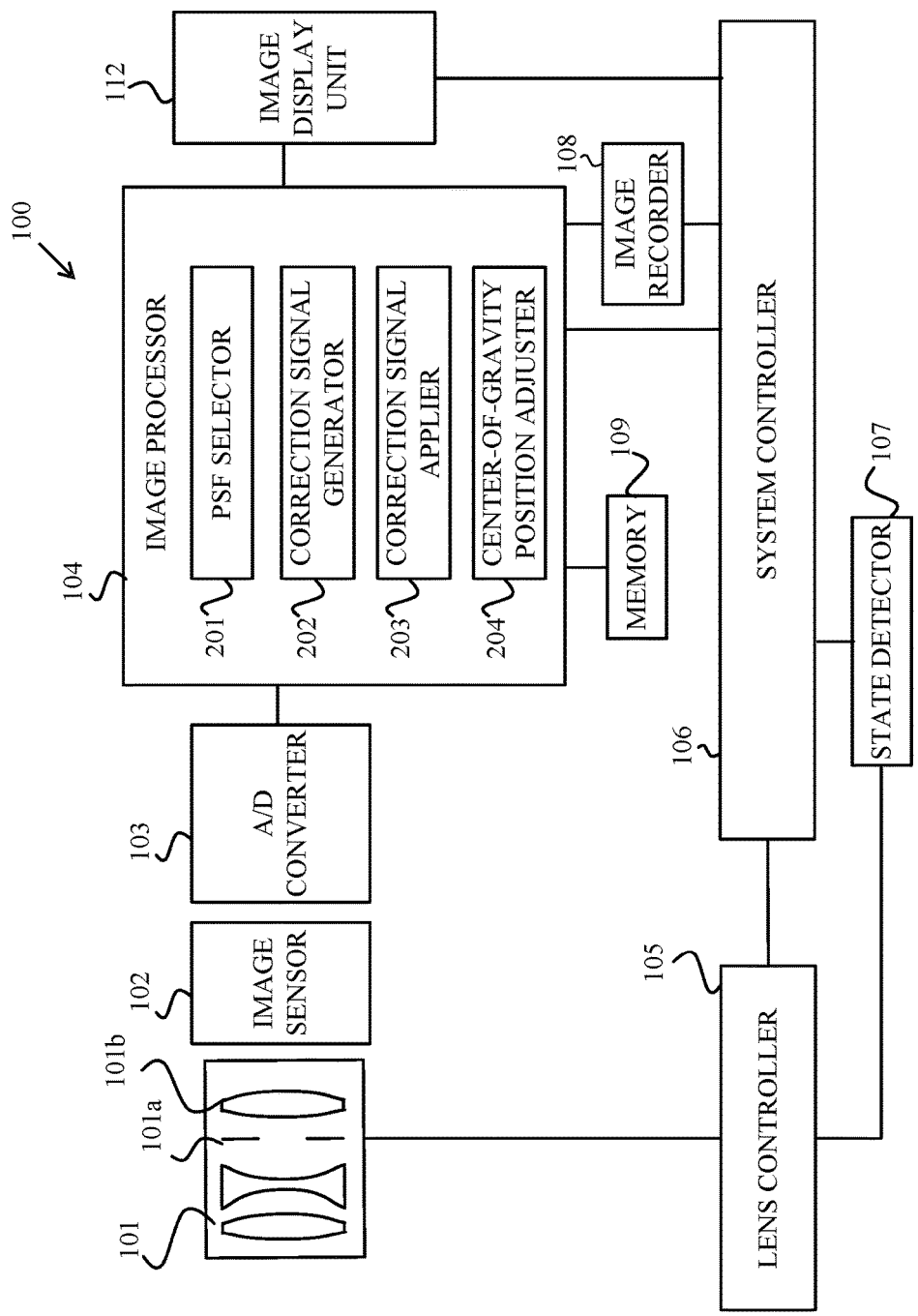
FIG. 1 is a block diagram illustrating a structure of an image pickup apparatus according to a first embodiment of the present invention.

Referring now to the accompanying drawings, a description will be given of embodiments according to the present invention.

Referring now to FIGS. 3A and 3B, a description will be given of unsharp mask processing as sharpening processing performed in concrete embodiments, which will be descried later. A solid line in FIG. 3A illustrates a captured image (input image) generated by image pickup using an image pickup optical system, and a broken line illustrates a blurred image (unsharp image) by blurring the captured image using an unsharp mask. A dotted line illustrates a (sharpened) image after sharpening. A solid line in FIG. 3B illustrates a correction component (also referred to as a "correction signal") as a difference between the captured image and the unsharp image.

Now assume that f(x, y) is a captured image and g(x, y) is a correction component. Then, a sharpened image g(x, y) can be expressed as follows:

$$g(x,y)=f(x,y)+m\times h(x,y) \quad (1)$$

In Expression (1), m is an adjustment coefficient for changing a correction intensity. It is possible to adjust a correction amount by changing a value of the adjustment coefficient m. Herein, m may be a constant irrespective of a position in the captured image, or may be variable according to a position in the captured image so as to adjust the correction amount according to the position of the captured image. The adjustment coefficient m may be made different according to the image pickup condition, such as a focal length, an aperture value, and an object distance of the optical system. Assume that USM represents an unsharp mask. Then, the correction component h(x, y) may be expressed as follows.

$$h(x,y)=f(x,y)-f(x,y)*USM(x,y) \quad (2)$$

The following expression can be obtained by transforming Expression (2).

$$h(x,y)=f(x,y)*(\delta(x,y)-USM(x,y)) \quad (3)$$

Herein, * represents a convolution, δ represents a delta function (ideal point image). The delta function is data equal to USM(x, y) in tap number, and has a center tap value (filter coefficient) of 1, and all other tap values of 0. Expression (3) calculates h(x, y) by convoluting (δ(x, y)−USM(x, y)) with f(x, y). However, as long as a target pixel (x, y) in the captured image accords with a position at which a tap number of δ(x, y) is 1 in convoluting (δ(x, y)−USM(x, y)), the center tap number may not be 1.

Expression (3) is different from Expression (2) in calculating method as processing, but Expression (2) is equivalent with Expression (3) because Expression (3) can be obtained by transforming Expression (2). A description will now be given of a generation of a correction component using Expression (2).

In Expression (2), the correction component h(x, y) is generated by calculating a difference between the captured image f(x, y) and an unsharp image that is made by blurring the captured image f(x, y) with an unsharp mask USM.

The general unsharp mask processing uses for the unsharp mask USM a smoothing filter, such as a Gaussian filter, a median filter, and a moving average filter. For example, where the Gaussian filter is used as the unsharp mask USM for the captured image f(x, y) expressed by the solid line in FIG. 3A, an unsharp image that is made by blurring the captured image f(x, y) is as illustrated by a dotted line in FIG. 3A. Since the correction component h(x, y) is a difference between the captured image f(x, y) and the unsharpened image as illustrated in Expression (2), the correction component expressed by the solid line in FIG. 3B can be obtained by subtracting the broken line in FIG. 3A from the solid line in FIG. 3A. By calculating Expression (1) using the thus calculated correction component, the captured image f(x, y) illustrated by the solid line in FIG. 3A can be sharpened as illustrated by the dotted line in FIG. 3A.

Next follows a description of a method for obtaining a sharpened image by performing the unsharp mask processing (correction processing) using a point spread function (referred to as a "PSF" hereinafter) of the optical system as the unsharp mask USM for the captured image deteriorated by image pickup through the optical system.

The captured image f(x, y) obtained via the optical system can be expressed as follows where I(x, y) is a pre-captured image (object image) and psf(x, y) is the PSF of the optical system.

$$f(x,y)=I(x,y)*psf(x,y) \quad (4)$$

As long as the optical system is a rotationally symmetrical coaxial optical system, the PSF corresponding to the center part in the captured image is rotationally symmetrical. Thus, the sharpening processing configured to make the captured image f(x, y) close to the original image I(x, y) can be realized by applying the rotationally symmetrical unsharp mask USM to the center part of the captured image. Since this correction amount is a difference value between the captured image and the unsharp image, a mask having a shape closer to psf(x, y) as the unsharp mask USM can provide a more precise correction rather than a simple smoothing filter. For example, when the image is deteriorated by a spherical aberration and the spherical aberration is used as the mask, a more precise correction is available than that with a mask having a distribution different from that of the PSF caused by the spherical aberration like a smoothing filter, such as a Gaussian filter, although the rotational symmetry may be sacrificed. Thus, even in reducing a rotationally symmetrical deterioration (blur), using the PSF of the optical system for the unsharp mask USM can provide a more precise correction.

Hence, the first embodiment which will be described later uses a PSF for the unsharp mask USM. While the captured image f(x, y) has a symmetrical shape in FIG. 3A that is used for the description of the unsharp mask processing, the captured image f(x, y) may not have the symmetrical shape. Even when the original image I(x, y) has a rotationally asymmetrical shape, sharpening using the rotationally symmetrical unsharp mask USM is available as long as the deteriorated function corresponding to psf(x, y) is rotationally symmetrical.

Figures 4A, 4B:
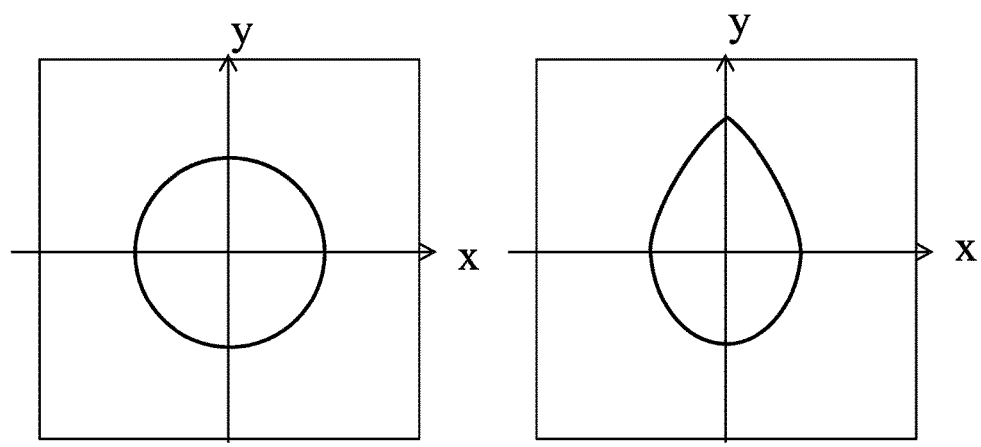
FIGS. 4A and 4B are views illustrating a PSF of an image pickup optical system in the image pickup apparatus according to the first embodiment.

On the other hand, even when the optical system is the rotationally symmetrical coaxial optical system, the PSF at a position in an image other than its center part usually has a rotationally asymmetrical shape. FIGS. 4A and 4B illustrate the PSF of the optical system on the xy plane. FIG. 4A illustrates the on-axis PSF, and FIG. 4B illustrates the off-axis PSF. For example, assume that the original image (object) is an ideal point image. Then, the captured image f(x, y) is subject to the PSF of the optical system according to Expression (4). When there is an ideal point image in the angle of view corresponding to FIG. 4B and the original image (object) is deteriorated due to the PSF of the optical system, the captured image is blurred as illustrated in FIG.

4B. A description will now be given of sharpening by performing the unsharp mask processing for the rotationally asymmetrical blurred image.

FIGS. 5A to 5D illustrate unsharp mask processing to the rotationally asymmetrical, deteriorated image. FIGS. 5A and 5B illustrate use of a rotationally symmetrical unsharp mask, and FIGS. 5C and 5D illustrate use of a rotationally asymmetrical unsharp mask. In FIGS. 5A and 5C, a solid line represents a section of the blurred captured image in the y-axis direction as in FIG. 4B, and a dotted line represents an unsharp image made by blurring the captured image with the unsharp mask. The rotationally symmetrical unsharp mask in FIG. 5A uses a Gaussian filter, and the rotationally asymmetrical unsharp mask in FIG. 5C uses the PSF of the optical system. FIGS. 5B and 5D illustrate a difference between the unsharp image and the original captured image in the y-axis direction or the correction component. In the captured images illustrated in FIGS. 5A and 5C, assume that a blur by the PSF spreads to the plus side in the y-axis direction.

When the rotationally symmetrical unsharp mask illustrated in FIG. 5A is used, a difference between the blurred image and the original image is small in the plus side of the peak position of the solid line in FIG. 5A, and a difference value increases between the blurred image and the original image in the minus side. Thus, in the correction component illustrated in FIG. 5B, an extreme value becomes smaller in the minus side than in the plus side of the center peak position. As understood from the comparison of the curves illustrated in FIGS. 5A and 5B, a correction amount of a correction component in the plus side of the captured image is small, and a correction amount in the minus side having a narrow spread is large. Thus, the correction component illustrated in FIG. 5B cannot correct a rotationally asymmetrical blur even with sharpening by Expression (4). For example, a method for changing the adjustment coefficient m in Expression (4) is conceivable as a method for adjusting a correction amount without changing an unsharp mask.

However, an attempt to sufficiently correct the plus side in the captured image by increasing the value of the adjustment coefficient m causes the overcorrection (undershoot) in the minus side in the captured image. On the contrary, the adjustment coefficient m that is set for proper corrections in the minus side in the captured image causes an insufficient correction or a correction shortage in the plus side in the captured image.

The sharpening and improvement of the asymmetry are thus difficult when the unsharp mask processing uses the rotationally symmetrical unsharp mask for the rotationally asymmetrically blurred captured image. While the Gaussian filter is used as an example of the rotationally symmetrical unsharp mask, another type of rotationally symmetrical filter for similar effects cannot sufficiently sharpen the rotationally asymmetrically blurred, captured image.

A description will be given of the rotationally asymmetrical unsharp mask illustrated in FIG. 5C. In this case, there are a large difference between the original image and the blurred image in the plus side of the peak position illustrated by the solid line in FIG. 5C, and a small difference between the original image and the blurred image in the minus side. This is contrary to FIG. 5A. Thus, the extreme value of the correction component illustrated in FIG. 5D is smaller in the plus side than in the minus side of the center peak position. When the correction component illustrated in FIG. 5D is applied to the captured image illustrated in the solid line in FIG. 5C, a correction amount becomes large to the plus side having a large blur amount of the peak position and a correction amount becomes small to the minus side having a small blur amount.

Due to such a rotationally asymmetrical unsharp mask, the blur distribution in the captured image in the plus and minus sides corresponds to a correction component (correction amount) distribution and the overcorrection and correction shortage that may occur with the rotationally symmetrical unsharp mask are less likely to occur. Since the overcorrection is less likely to occur than a case where the rotationally symmetrical unsharp mask is used, the value of the adjustment coefficient m in Expression (4) can be set comparatively large. Hence, this embodiment can reduce the asymmetry and obtain a sharpened image. In conclusion, this embodiment uses a filter that has rotationally asymmetrical filter coefficients (tap values) on the filter plane relative to the filter coefficient corresponding to the target pixel in the captured image.

Since a correction component (correction amount) is determined based on the difference between the original image and the blurred image, the unsharp mask needs to more blur a more blurred part by the PSF of the optical system for precise corrections. For more precise corrections, the PSF of the optical system may be used for the unsharp mask.

Next follows a description of the center of gravity position and the peak position of the unsharp mask and the sharpening effect by the unsharp mask processing. In the following description, the center of gravity position of the unsharp mask or the filter is the center of gravity position of a plurality of filter coefficients (tap values) given to each of a plurality of taps in the filter. The center position of the filter is the center tap position of the filter. The filter generated using the PSF of the optical system corresponding to the target pixel (also referred to as a "specific position" hereinafter) in the captured image (input image) is applied to the captured image while the center position of the filter is accorded with the specific position. The specific position is one arbitrary pixel among all pixels in the captured image. Even when the specific position is not accorded with the center position of the filter, processing, such as shifting, to the convoluted image after the convolution can provide similar effects and thus the accordance is not always required. The peak position of the filter is a tap position having the maximum filter coefficient among the plurality of taps.

Figure 14A:
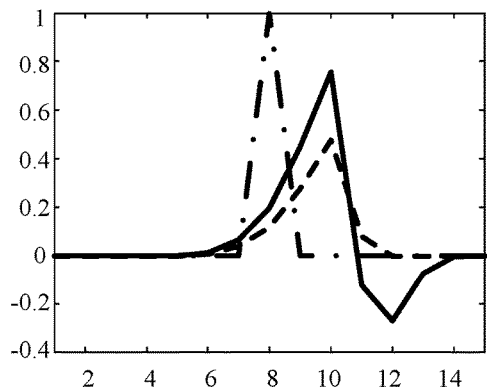
FIGS. 14A to 14D are views illustrating a relationship between a center of gravity position of the PSF and a sharpening effect.
Figure 14B:
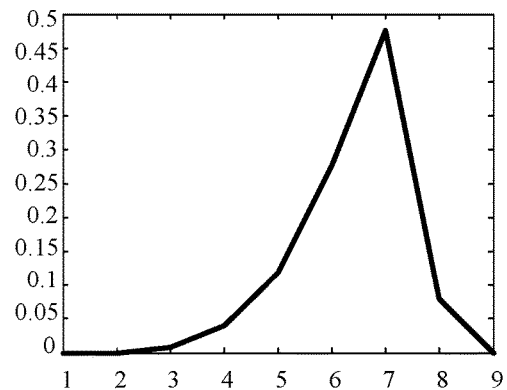
Figure 14C:
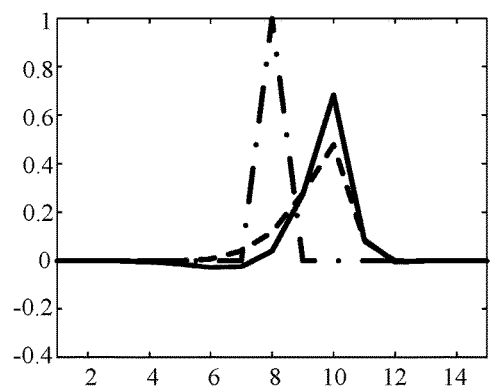
Figure 14D:
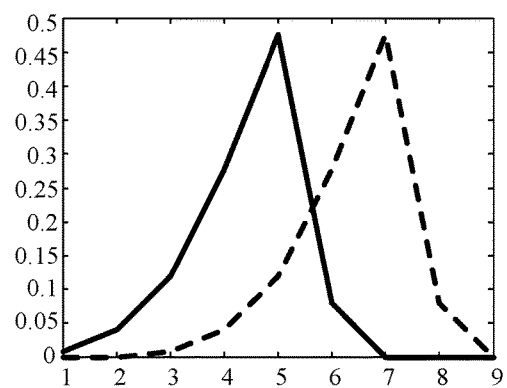

FIGS. 14A to 14D illustrate unsharp mask processing to an asymmetrically degraded captured image. In FIGS. 14A and 14B, the center of gravity position of the filter as the unsharp mask is not adjusted. In FIGS. 14C and 14D, the center of gravity position of the filter as the unsharp mask is adjusted. In FIGS. 14A and 14C, a solid line represents a sharpened object image, an alternate short and long dash line represents an ideal object image (having no blurs), and a broken line represents an object image in an asymmetrically deteriorated state. In FIGS. 14B and 14D, a solid line represents a filter used as an unsharp mask, and a broken line represents the PSF of the optical system that deteriorates the object image illustrated by the alternate long and short dash line into the deteriorated image illustrated by the broken line in FIG. 14A.

The filter in FIG. 14B is used as the unsharp mask without adjusting the center of gravity position, and the broken line accords with the solid line in FIG. 14B. When the unsharp mask uses the filter in which the center of gravity position is not adjusted, a problem may occur due to a shift between the center position of the filter and the peak position and the center of gravity. This problem can be seen in FIG. 14A, in which the sharpened peak is higher and improves than that of the deteriorated image but undershoot occurs in the periphery. It is assumed that the center of gravity position of the distribution changes from the ideal state illustrated by the alternate long and short dash line to the designated state illustrated by the broken line, and the effect of correcting the change of the center of gravity position works in the unsharp mask processing from the deteriorated state illustrated by the broken line to the sharpened state illustrated by the solid line.

On the other hand, as illustrated in FIG. 14C, when the unsharp mask uses the filter in FIG. 14D in which the center of gravity is adjusted for sharpening, the problem of undershoot seen in FIG. 14A can be restrained. Now address a change of the center of gravity position before and after the sharpening by the unsharp mask processing in FIG. 14C. Then, the sharpening almost maintains the center of gravity position of the deteriorated state illustrated in the broken line instead of moving to the ideal state illustrated by the alternate long and shot dash line. It is necessary to correct the center of gravity position to obtain the ideal state, the correction of only the center of gravity position is parallel shift and a geometric correction works, such as the distortion correction and the lateral chromatic aberration correction. This embodiment does not correct a phase shift, but performs the unsharp mask processing for the sharpening processing using the filter in which the center of gravity position is adjusted as illustrated in FIG. 14D, thereby providing a highly precise correction while restraining the problem of undershoot etc. by performing.

This embodiment adjusts the center of gravity position as follows in generating the filter using the information relating to the PSF of the optical system at a specific position (target pixel) in the captured image (input image). In other words, the center of gravity position of each filter coefficient in the filter generated using the information relating to the PSF of the optical system is adjusted to or close to the tap position corresponding to the specific position in the captured image in the filter. In FIG. 14D, the center position of the filter and the specific position in the captured image are a position of the tap 5 illustrated by the horizontal axis. Regarding the center position and the specific position, the center of gravity position of the adjusted filter coefficient is closer to the center position of the filter than the center of gravity position of the pre-adjustment filter coefficient.

The center of gravity position of the filter may or may not be accorded with the center position of the filter, as described later. As described later, the center of gravity of the filter may be replaced with the peak position. Although the above embodiment discusses the adjustment of the center of gravity position of the filter, the peak position of the filter may be adjusted so as to reduce the problem of the sharpening processing similarly to the adjustment of the center of gravity position, in comparison with a case where the peak position of the filter is not adjusted. In setting the peak position of the filter to the center position of the filter, the position having the maximum filter coefficient may be detected and it is unnecessary to calculate the center of gravity position of the filter coefficient. Thus, the processing can become faster and simpler. While the following description mainly adjusts the center of gravity position of the filter, the adjusted object may be peak position instead of the center of gravity position so as to realize a similar sharpening effect and to reduce the problem.

Next follows a description of a generating method of a filter (unsharp mask) having an adjusted center of gravity position. As the generating method of the filter having the adjusted center of gravity position, there are a first method for generating a filter using PSF data (PSF having the adjusted center of gravity position) in which the center of gravity position is previously adjusted, and a second method for adjusting the center of gravity position of the filter in generating the filter based on the PSF of the optical system. This embodiment assumes that a computer performs the filter generating processing according to a computer program.

Referring to the flowchart of FIG. 15, a description will be given of the filter generating processing as the above first method. Initially, in step S011, the computer generates a pupil function of the optical system. The pupil function can be calculated by calculating a wavefront aberration through ray tracing with optical CAD etc. This processing broadly sets a range of data to the pupil function so as to improve the calculational precision.

Figure 16A:
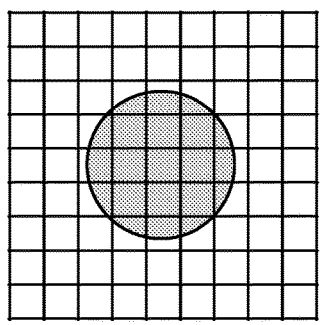
FIGS. 16A and 16B are views illustrating a pupil function of an optical system.
Figure 16B:
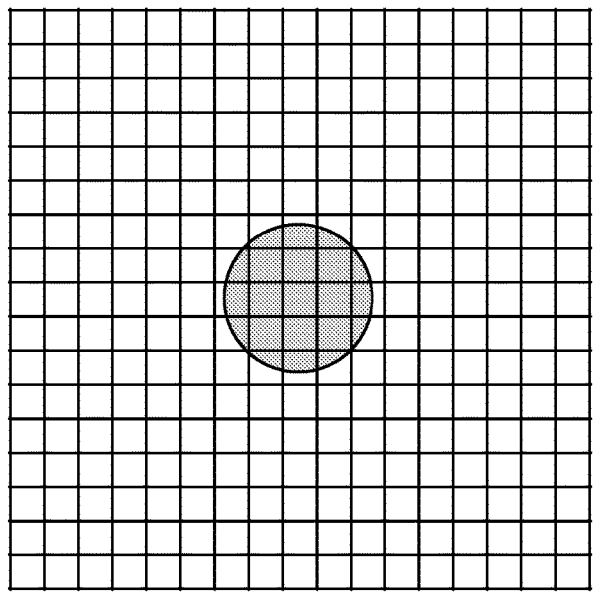

FIGS. 16A and 16B illustrate two-dimensional data of the pupil function. In FIGS. 16A and 16B, the sampling pitches are equal to each other and data sizes to the pupil diameter are different from each other. Data has a value of zero in an area outside the pupil in which the light does not pass. The PSF calculated in the next step can be more fractionated by enlarging the area in which the value is zero as illustrated in FIG. 16B.

Next, in step S012, the computer calculates the PSF of the optical system. The PSF can be calculated by calculating the amplitude distribution of the point image through the Fourier transform of the pupil function, and by squaring the absolute value of the amplitude of the obtained point image. The PSF may be calculated based on the optical characteristic of the low-pass filter and the image sensor in addition to the optical system.

Figure 17:
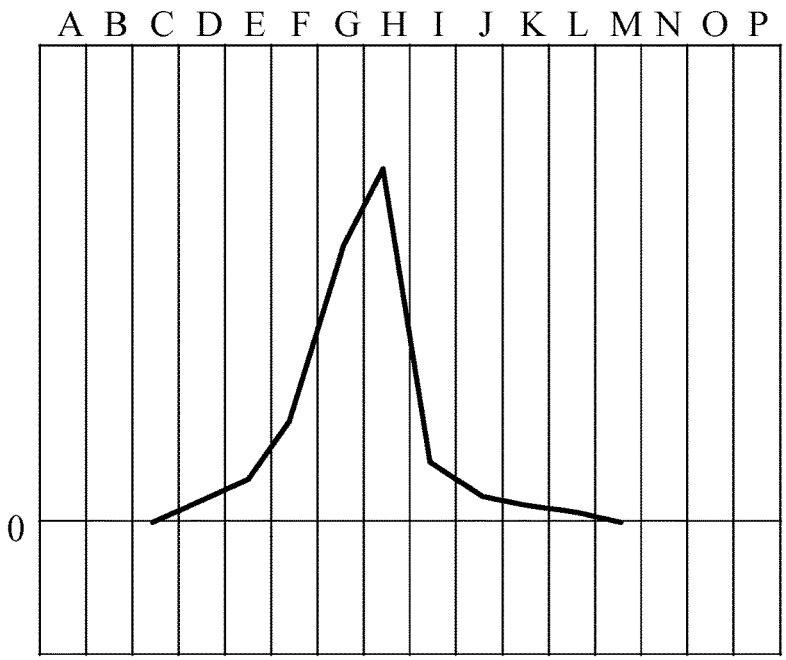
FIG. 17 is a sectional view of the PSF.

Next, in step S013, the computer generates the PSF having the adjusted center of gravity position by adjusting the center of gravity position in the PSF of the optical system calculated in the step S012. Herein, the center of gravity position of the PSF having the adjusted center of gravity position is adjusted close to the center in the trimmed area in the following step S014 (or close to the center position of the filter). More specifically, the position that provides the center of gravity (of the intensity) of the PSF is calculated by scanning the PSF of the optical system calculated in the step S012. FIG. 17 illustrates the PSF having the adjusted center of gravity position produced in the S013. The vertical axis in this figure corresponds to the intensity, and position G is the center of gravity position of this data.

Next, in step S014, the computer selects the area so that the center of gravity position G of the PSF having the adjusted center of gravity position calculated in S013 can be close to the center position of the filter, and produces the filter by trimming (extracting) the area. From the PSF having the adjusted center of gravity position illustrated in FIG. 17, the center of gravity position G can be set close to the center position of the filter by trimming the range from A to M. When the spread of the PSF having the adjusted center of gravity is excessively cut in trimming the PSF having the adjusted center of gravity position, a shift from the original PSF increases and a problem may occur. Thus, in the step S014, the trimmed area in the PSF having the adjusted center of gravity is set to a reasonably broad range by considering the above influence.

Next, in step S015, the computer adjusts the filter obtained by trimming the PSF having the adjusted center of gravity in the step S014, so as to maintain a proper tap number and sampling pitch. The unsharp mask generated in this processing is used for the sharpening processing to the captured image after it is generated, and it is necessary to adjust the filter obtained in the step S014 to the pixel pitch in the actual image sensor. Thus, the step S015 down-samples the filter obtained in the step S014 so as to generate a filter that matches the actual pixel pitch.

This processing generates the filter matching the pixel pitch by setting a large tap number of the filter and by performing the down-sampling. However, in order to restrain the number of processing steps and a calculation amount rather than in order to improve the calculation precision, the calculation matching the pixel pitch of the image sensor may be provided from the beginning.

Finally, in step S016, the computer normalizes the filter adjusted in the step S015 so that a sum of the tap values can be 1, and outputs the normalized filter. Thus, the unsharp mask as a filter having the adjusted center of gravity position can be generated.

Figure 15:
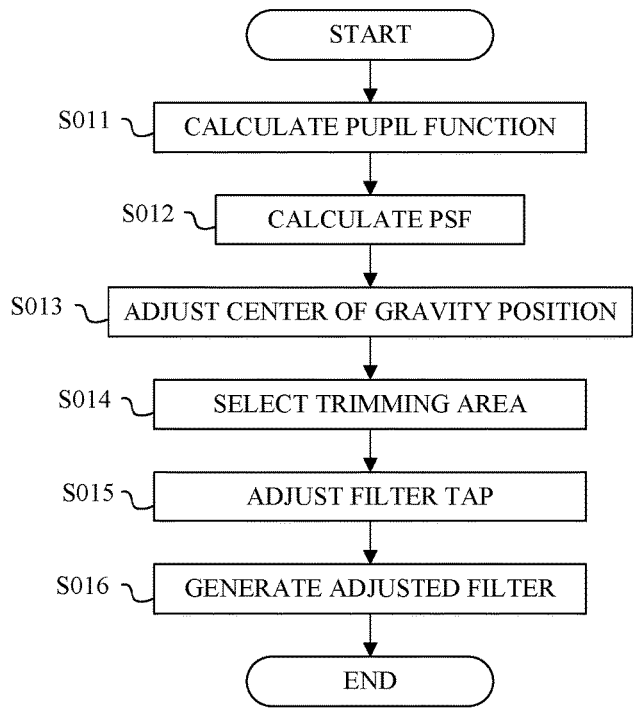
FIG. 15 is a flowchart illustrating adjusting processing of the center of gravity position of the PSF.

The processing illustrated in FIG. 15 provides the tap adjustment processing in the real space in the step S015, but may provide the adjustment processing in the frequency space. As the overall flow, the processing performs the Fourier transform for the filter trimmed in the step S014, extracts the area corresponding to the Nyquist frequency of the image sensor in the frequency space, and performs inverse Fourier transform. This processing can realize the tap adjustment through the frequency space.

Referring now to the flowchart of FIG. 18, a description will be given of the filter generating processing according to the second method. Initially, in step S021, the computer obtains the PSF. In this case, the PSF corresponding to the optical axis of the optical system is rotationally symmetrical if there is no influence of a manufacture error, etc., and the center of gravity and the center of the PSF accord with each other. This processing may be performed for the PSF. In order to reduce the processing load, the PSF for this processing may be previously selected rather than performing the processing for all PSFs. This processing assumes discretized data illustrated in FIG. 17 as the PSF.

Next, in the step S022, the computer performs zero padding for the PSF obtained in the step S021, and expands the tap number of the PSF data. Thus, part of area can be trimmed by increasing the tap number of the data without changing the tap number and sampling pitch for the PSF in adjusting the center of gravity position.

In the next step S023, the computer calculates the center of gravity position of the PSF in which the tap number is expanded by the step S022.

In step S024, the computer produces the filter by determining the area so as to set the center of gravity position of the PSF calculated in the step S013 close to the center of the filter, and by trimming (extracting) the area.

In step S025, the computer adjusts the filter generated in the step S024 so as to provide the proper tap number and sampling pitch.

Finally, in step S026, the computer normalizes the filter adjusted in the step S025 so that a sum of the tap values can be 1, and outputs the normalized filter. Thus, the unsharp mask can be generated as the filter in which the center of gravity position is adjusted.

Figure 18:
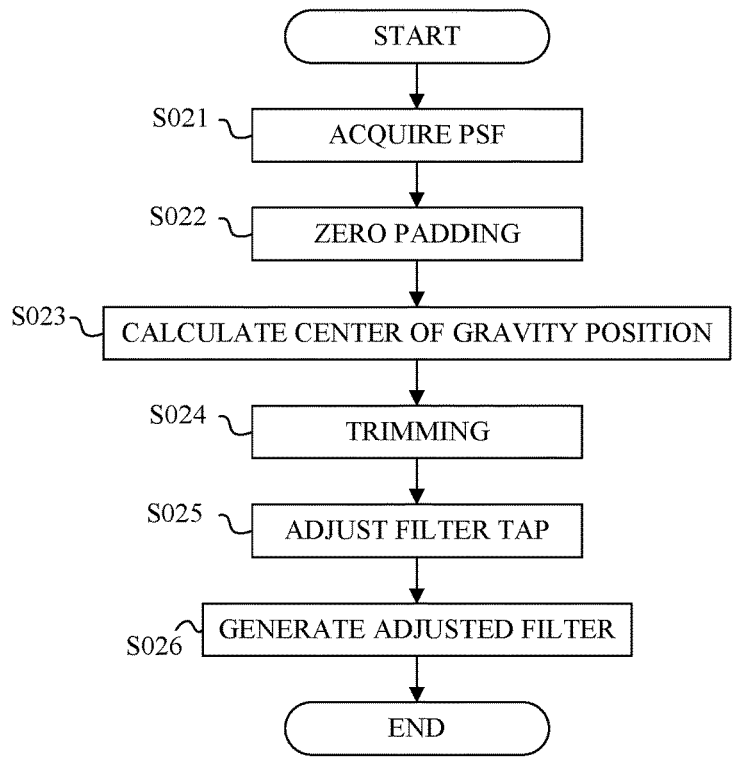
FIG. 18 is a flowchart illustrating adjusting processing of the center of gravity position of the PSF.

In FIGS. 15 and 18, no interpolation etc. is performed in adjusting the center of gravity position. When the center of gravity position is adjusted for each sub-pixel, the interpolation and extrapolation may be performed using a bicubic method and a bilinear method. A more precise and finer adjustment of the center of gravity position is available by performing processing from the steps S014 to S016 in FIG. 15 and the steps S024 to S026 in FIG. 18.

The sharpening processing using the filter in which the center of gravity position is adjusted by this processing can restrain, the problem, such as undershoot, but may reduce the sharpening effect. One cause is, for example, a shift of the filter distribution from the original PSF shape due to the adjustment of the center of gravity of the filter. When the optical system has good performance, the PSF is close to the shape of the delta function. In this processing that performs down-sampling for the interpolated filter, information may lack due to the down sampling. In other words, when the PSF of the optical system is used for the filter, it is necessary to maintain the original PSF shape with the given filter tap number in addition to making an adjustment that accords the center of gravity position of the filter with the center tap position (center position). For these purposes, it is not always necessary to set the center of gravity position to the center position of the filter, and the center of gravity position may be located in a range near the center position. This method can restrain the problem of undershoot etc. caused by the shift between the center position of the filter and the center of gravity position, and can obtain a sufficient sharpening effect.

More specifically, the center of gravity position may be adjusted so as to satisfy the following condition.

$$j-\sigma<c<j+\sigma \quad (101)$$

Herein, σ is as follows:

$$\sigma = \sqrt{\sum_{i=1}^{N}\{(i-j)^2 \times f(i)\} \Big/ \sum_{i=1}^{N} f(i)}$$

In Expression (101), f(i) denotes an i-th filter coefficient (tap value) in one section (one-dimensional data) that passes the center of gravity position of the filter, and j denotes the center of gravity position on the one section. N denotes the tap number on the one section of the filter, and c denotes the center position of the filter on the one section. In other words, Expression (101) means that the center position of the filter is arranged in a range from (j−σ) to (j+σ).

The condition of Expression (101) is applied to the filter illustrated in FIGS. 14A and 14B. Table 1 summarizes illustrative filter coefficients at nine taps (No. 1 to No. 9) in the filter illustrated in FIG. 14B.

TABLE 1

| NO. | 1 | 2 | 3 | 4 | 5 | 6 | 7 | 8 | 9 |
|---|---|---|---|---|---|---|---|---|---|
| CO-EFFI-CIENT VALUE | 0.000 | 0.000 | 0.008 | 0.040 | 0.119 | 0.278 | 0.476 | 0.079 | 0.000 |

When σ, j, and c are calculated based on the values in Table 1, σ=0.952, j=6.413, and c=5 are established, which are lower than the lower limits of Expression (101). Thus, undershoot occurs due to the shift between the center position and the center of gravity position.

The filter in FIG. 14D shifts from the filter in FIG. 14B by two taps. By using the values that are made by shifting the values in Table 1 by the two taps, j=4.413 is established. In other words, the adjustment processing of the gravity position satisfies the condition in Expression (101). Thus, the asymmetry of the captured image can be mitigated so as to sharpen the captured image without the problem of undershoot, etc.

Figure 19A:
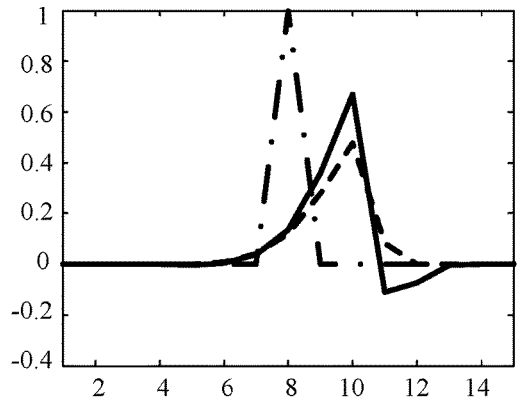
FIGS. 19A and 19B are views illustrating the relationship between the center of gravity position of the PSF and the sharpening effect.
Figure 19B:
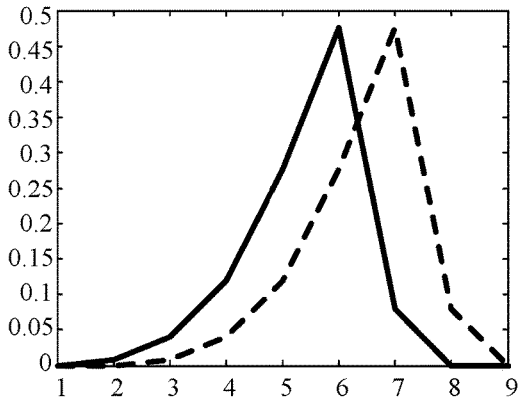

When the values shift by one tap from the filter in FIG. 14B, j=5.413 is established and the condition of Expression (101) is satisfied. FIG. 19A illustrates an object image in the ideal state by an alternate long and short dash line. An asymmetrically deteriorated object image is illustrated by a broken line. A sharpened object image is illustrated by a solid line. FIG. 19B illustrates the PSF (broken line) in which the object image is deteriorated from the ideal state to the deteriorated state, and a filter (solid line) using the unsharp mask. In FIG. 19A, the sharpened object image has a little undershoot, but the sharpening effect and asymmetry reducing effect can be confirmed.

Thus, this embodiment can restrain the problem and obtain the sharpening effect by adjusting the center of gravity position of the filter so as to satisfy the condition of Expression (101), but may adjust the peak position for accelerations instead of adjusting the center of gravity position of the filter. The PSF has an asymmetrical shape according to the image height. In the optical system in which the performance is secured to some extent, the kurtosis in the PSF increases. Therefore, the filter peak position and the center of gravity position are not significantly different from each other. Since the calculation for finding the center of gravity can be omitted by adjusting the peak position so as to satisfy Expression (101) by using the peak position instead of the center of gravity position, the processing can be faster.

A description will now be given of the filter, correction signal (correction data), and unsharp mask processing according to the first to third embodiments.

The first embodiment performs unsharp mask processing using the following expression led from Expressions (1) and (2).

$$g(x,y)=f(x,y)+m\times\{f(x,y)-f(x,y)*USM(x,y)\} \quad (5)$$

The second embodiment performs unsharp mask processing using Expression (6) led from Expressions (1) and (3).

$$g(x,y)=f(x,y)+m\times f(x,y)*\{\delta(x,y)-USM(x,y)\} \quad (6)$$

The third embodiment performs unsharp mask processing using Expression (7) that is a transform of Expression (6).

$$g(x,y)=f(x,y)*\{\delta(x,y)+m\times(\delta(x,y)-USM(x,y))\} \quad (7)$$

USM(x, y) is an unsharp mask in Expressions (5) to (7). The first embodiment uses USM(x, y) for the filter, the second embodiment uses the difference (δ(x, y)−USM(x, y)) between the unsharp mask (PSF) and the ideal point image, for the filter. The third embodiment uses for the filter the correction signal or the difference between the unsharp mask (PSF) and the ideal point image multiplied by the adjustment coefficient m added to the ideal point image {δ(x, y)+m×(δ (x, y)−USM(x, y))}. Each filter coefficient in the filter according to the first to third embodiments corresponding to the target pixel in the captured image have a positive value.

First Embodiment

FIG. 1 illustrates a structure of an image pickup apparatus according to the first embodiment. An image processor (image processing apparatus) 104 is provided in an image pickup apparatus 100. The image processor 104 performs unsharp mask processing (image processing method) as sharpening processing for a captured image (input image) in accordance with an image processing program as a computer program.

The image pickup apparatus 100 has an image pickup optical system (referred to as an "image pickup lens" hereinafter) 101 and an image pickup apparatus body (referred to as a "camera body" hereinafter). The image pickup lens 101 includes a diaphragm 101a and a focus lens 101b. While this embodiment describes a lens integrated type image pickup apparatus in which the image pickup lens 101 is integrated with the camera body, the present invention is applicable to a lens interchangeable type image pickup apparatus in which the image pickup lens 101 is interchangeably attached to the camera body.

The image sensor (image pickup unit) 102 is a two-dimensional photoelectric conversion element, such as a CCD sensor and a CMOS sensor. The image sensor 102 generates an analogue electric signal by photoelectrically converting an object image (imaged light) formed by the image pickup lens 101. The analogue electric signal output from the image sensor 102 is converted into a digital signal by the A/D converter 103, and this digital signal is input as a captured signal into the image processor 104.

The image processor 104 generates a captured image through predetermined processing to an input captured signal, and performs unsharp mask processing for the captured image. The image processor 104 obtains information of an image pickup condition as the state of the image pickup lens 101 in the image pickup for obtaining the captured image from a state detector 107. The image pickup condition contains an aperture value and an object distance (position of the focus lens 101b), and the focal length when the image pickup lens 101 is a zoom lens. The state detector 107 may obtain the information of the image pickup condition from a system controller 106, or from a lens controller 105 that controls the image pickup lens 101.

The image processor 104 includes a PSF selector 201, a correction signal generator 202, a correction signal applier 203, and a center-of-gravity position adjuster 204 for unsharp mask processing. The PSF selector 201, the control signal generator 202, and the center-of-gravity position adjustor 204 correspond to a filter generator. The correction signal applier 203 corresponds to a corrector configured to provide unsharp mask processing (correction processing).

The image processor 104 converts a sharpened image generated by the unsharp mask processing into data having a predetermined format, and stores the data in an image recorder 108.

An image display unit 112 displays a display image obtained by performing predetermined display processing for a sharpened image. The system controller 106 controls each component described above. The lens controller 105 controls mechanical driving of the image pickup lens 101 based on a command from the system controller 106.

An optical element, such as a low-pass filter and an infrared cut filter, may be inserted into the image pickup lens 101. When the optical element that affects the PSF characteristic, such as the law-pass filter, is used, highly precise unsharp mask processing may be provided by considering the influence of this optical element in producing the unsharp mask. Since the infrared cut filter affects each PSF of the RGB channels as the integrated value of the PSF of the spectral wavelength, in particular, the PSF of the R channel, the influence of this infrared cut filter may be considered in producing the unsharp mask.

Referring now to FIG. 2, a description will be given of a basic flow of the unsharp mask processing in this embodiment. The image processor 104 as the computer that has received the command from the system controller 106 executes this processing in accordance with the above image processing program.

In step S11, the image processor 104 acquires a captured image as an input image.

Next, in step S12, the PSF selector 201 acquires a PSF of the image pickup lens 101 image corresponding to the input image from the memory 109. The information relating to the PSF which the PSF selector 201 acquires may be two-dimensional tap data representing the PSF or plural pieces of one-dimensional tap data as a component of the PSF for compressions of the data amount and accelerated processing. The information relating to the PSF may be information of the PSF coefficient. In the following description, the information relating to the PSF will be referred to as PSF information.

Next, in step S13, the center-of-gravity position adjuster 204 performs processing of FIG. 18 for the PSF represented by the PSF information acquired in the step S12, and generates the unsharp mask as the filter in which the center of gravity position is adjusted.

Figure 6A:
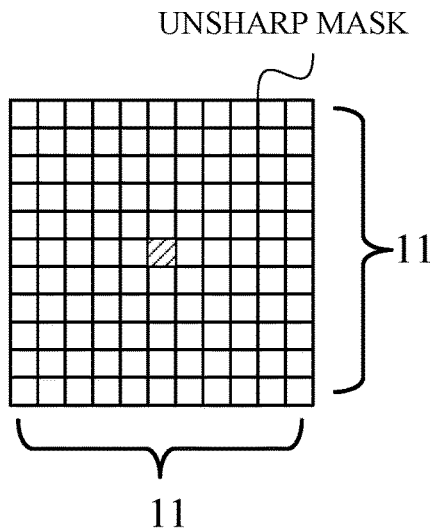
FIGS. 6A and 6B are views illustrating the unsharp mask according to the first embodiment.
Figure 6B:
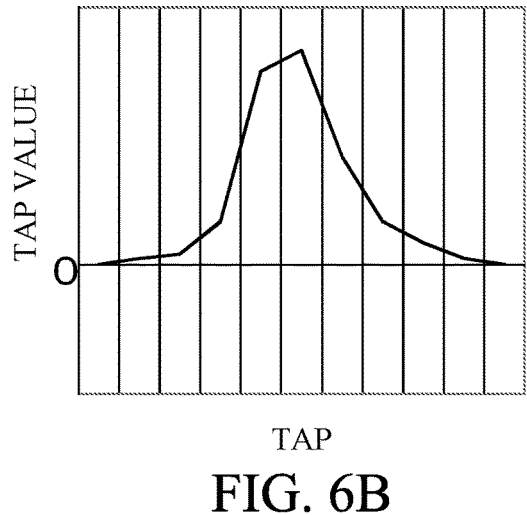

FIGS. 6A and 6B illustrate an illustrative unsharp mask. The tap number of the unsharp mask is determined based on the aberrational characteristic of the image pickup lens 101 and the required sharpening precision. FIG. 6A illustrates the illustrative unsharp mask having a filter size of two-dimensionally arranged 11×11 taps. FIG. 6A omits each tap value as a filter coefficient, but FIG. 6B illustrates tap values on one section in this unsharp mask. An ideal distribution of the tap values in the unsharp mask is a distribution similar to a shape of signal values that spread due to the aberrations (or the PSF of the image pickup lens 101) or the rotationally asymmetrical tap value distribution around the center tap hatched in FIG. 6A.

When the unsharp mask is generated using the PSF information in the step S14, the PSF changes according to the image height of the input image (or the position in the image) and thus the unsharp mask may be changed according to the image height.

Next, in the step S14, the correction signal generator 202 generates a correction signal (correction data) using the unsharp mask generated in the step S13. The generating processing of the correction signal will be described in details later.

In the next step S15, the correction signal applier 203 applies to the input image the correction signal generated by the correction signal generator 202 in the step S14 or performs the unsharp mask processing for the input image. The processing in the step S15 will be described in details later.

Figure 7:
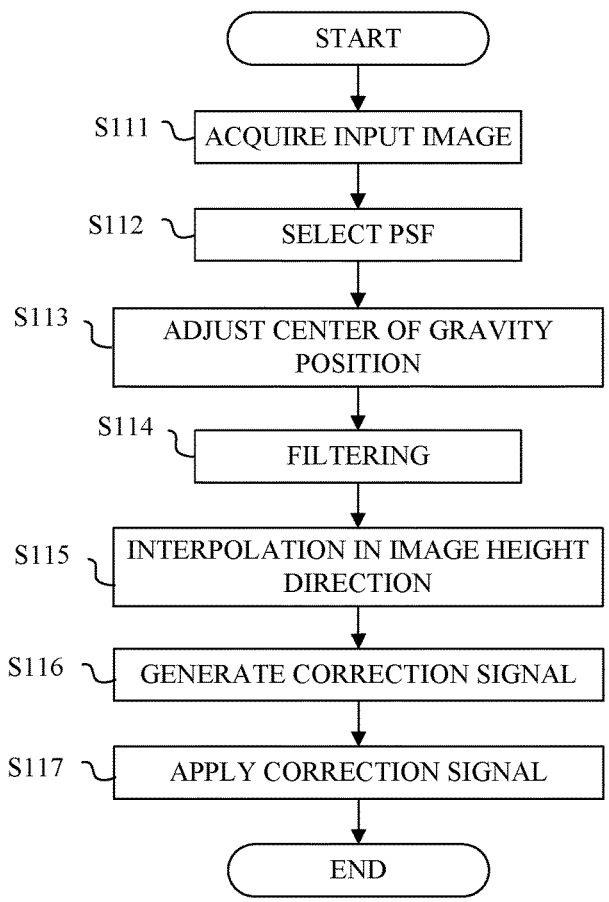
FIG. 7 is a flowchart illustrating details of the image processing according to the first embodiment.

Referring now to FIG. 7, a detailed description will be given of the flow of the unsharp mask processing described in FIG. 2.

Initially, in step S111, the image processor 104 acquires the captured image as the input image. The data actually used as the input image in the unsharp mask processing in the captured image is image data of the demosaicked G channel. Of course, the input image may use the image data of the R channel or B channel, or the image data of all RGB channels. The input image may use pre-demosaicking image data.

Figure 8:
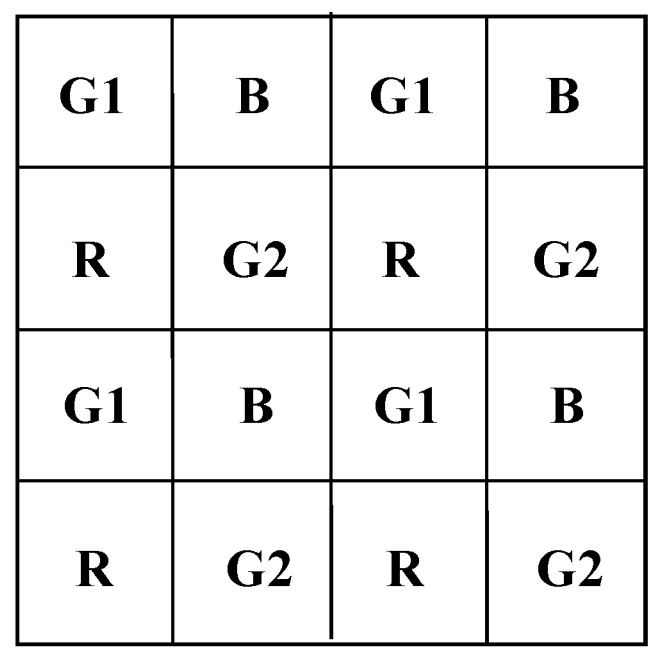

FIG. 8 illustrates a Bayer arrangement used as a general pixel arrangement on the image sensor. The input image may use image data of a specific channel, such as the G channel, simply extracted or all channels from the captured image based on the image pickup signal from the image sensor having the Bayer arrangement. FIG. 8 divides the G channel into two channels G1 and G2. By dividing the G channel into two, image data of the respective channels R, G1, G2, and B have equal resolutions, and thus the transaction and data processing become easy.

Next, in step S112, the PSF selector 201 acquires the PSF information of the image pickup lens 101 from the memory 109. As described in the step S12 in FIG. 12, the acquired PSF information may be two-dimensional tap data representing the PSF or plural pieces of one-dimensional tap data as the PSF component. One method for dissolving the two-dimensional data into plural pieces of one-dimensional data, for example, is a singular value decomposition theory. Based on this theory, a dissolved major component is stored in the memory 109, and plural pieces of one-dimensional tap data may be acquired which correspond to the major component of the PSF according to the image pickup condition of the image pickup lens 101.

Since the PSF changes according to the image height as described above, the unsharp mask is generated using the PSF for each image height and the correction signal is generated for each image height using this unsharp mask, for highly precise unsharp mask processing. However, the memory 109 has a limited recordable data capacity, and it is impracticable to store the PSF information for each image height in the memory 109. Accordingly, this embodiment divides the input image into a plurality of image areas, and provides interpolation processing for each image area using the PSF information at least at two specific image heights (or at specific positions having different image heights). Thereby, an unsharp mask corresponding to the image height other than the specific image height or an unsharp image can be generated which is blurred by the unsharp mask. An interpolation processing method will be described in details in the following step S115.

Figure 9A:
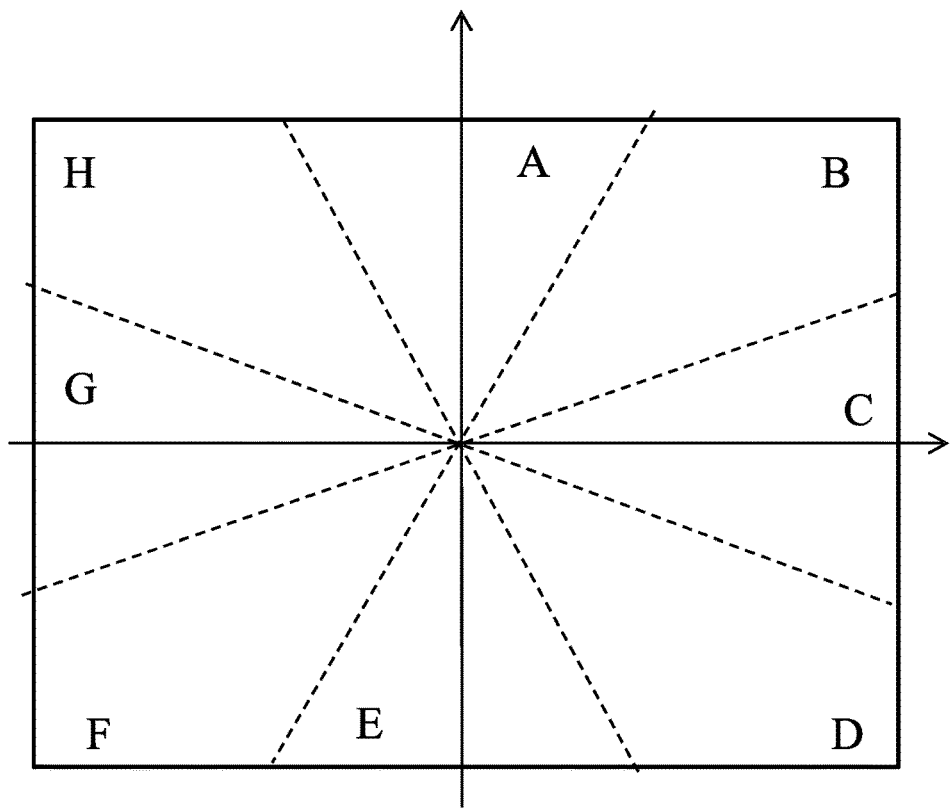
FIGS. 9A and 9B are views illustrating a dividing method of an input image and an interpolation method in an image height direction.

A description will now be given of a division of an input image into a plurality of image areas. FIG. 9A illustrates the input image. A long side direction of the input image is set to an x-axis direction, a short side direction is set to a y-axis direction, and the center of the input image is set to an origin of the coordinate. This embodiment divides the input image into eight image areas A to H, and obtains the PSF information in the periphery of each image area and the origin. The number of divided image area is not limited to eight, and may be determined based on the image pickup condition of the image pickup lens 101 in the image pickup and the optical characteristic of the image pickup lens 101 or the data capacity in the memory etc.

Next, in step S113, the center-of-gravity adjuster 204 performs processing of FIG. 18 for the PSF illustrated by the PSF information at the specific image height acquired in the step S112, and generates the unsharp mask as the filter for each specific image height in which the center of gravity position is adjusted.

When it is unnecessary to previously adjust the center of gravity position, the adjustment may not be performed. The processing becomes faster by determining whether or not the center of gravity position of the filter is to be adjusted for the PSF acquired in the step S112. For example, when the PSF information corresponds to the optical axis of the image pickup lens 101, the adjustment of the center of gravity position may be omitted through calculations for setting the optical axis to the center of the filter. As described later, the adjustment of the center of gravity position may be omitted by previously performing the adjustment in the generating step of the PSF.

Next, in step S114, the correction signal generator 202 performs filtering using the unsharp mask as the filter for each specific image height in which the center of gravity position is adjusted in the step S113. This embodiment uses the unsharp mask for the filter corresponding to the PSF, and provides filtering by convoluting the unsharp mask with the input image. The step S112 obtains totally nine PSFs corresponding to the center image height (optical axis) at the specific image height and eight peripheral image heights. Nine blurred unsharp images are obtained by convoluting each of these nine PSFs as the unsharp mask with the input image. These nine unsharp images correspond to intermediate data for the unsharp mask processing (correction processing).

Next, in step S115, the correction signal generator 202 performs the interpolation processing in the image height direction using the nine unsharp images generated in the step S114, and generates image data filtered with one unsharp mask.

Figure 9B:
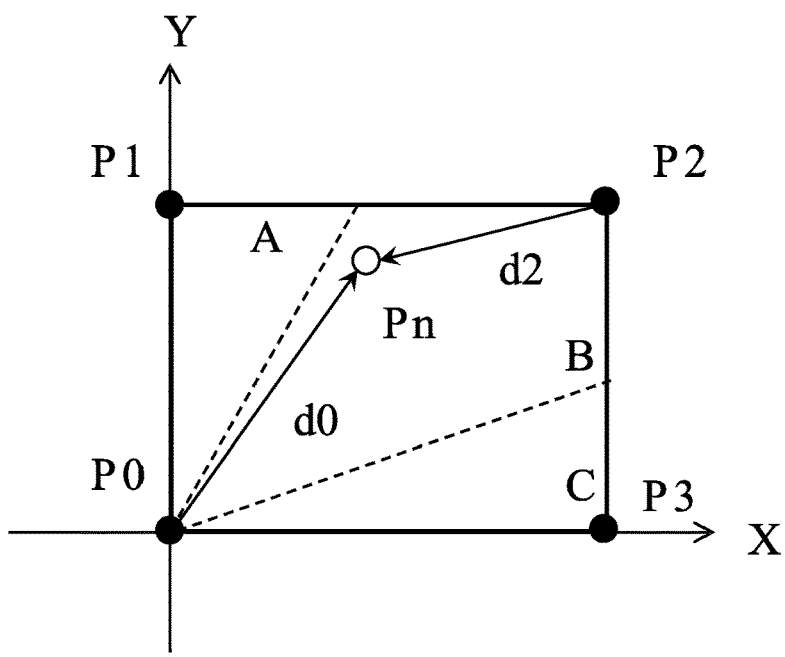

Referring now to FIG. 9B, a description will be given of the interpolation processing in the image height direction. In FIG. 9A, a direction from the origin to the image area C is set to a positive side in the X-axis direction, and a direction from the origin to the image area A is set to a positive side in the y direction. FIG. 9B illustrates the first quadrant in which both x and y are positive in the input image. Herein, P0 denotes the origin (central image height), and P1, P2, and P3 denote peripheral image heights in the image areas A, B, and C. Assume that the PSF selector 201 obtains the PSF information of these image heights P0, P1, P2, and P3 (referred simply to as "PSF" hereinafter) in the step S112. Pn illustrated by a white dot in FIG. 9B represents an arbitrary image height in the image area B.

At the image height Pn in the image area B, the unsharp mask as intermediate data is obtained by filtering (convoluting) with the input image the unsharp mask at the arbitrary image height Pn prepared in the step S114 using the PSFs at the image heights P0 and P2. Similarly, at an arbitrary image height in the image area A, the unsharp image is obtained as the intermediate data by filtering with the input image, the unsharp mask at the arbitrary image height prepared using the PSFs at the image heights P0 and P1. At an arbitrary image height in the image area C, the unsharp image is obtained as the intermediate data by filtering with the input image the unsharp mask at the arbitrary image height prepared using the PSFs at the image heights P0 and P3.

A description will now be given of a method for generating intermediate data corresponding to the filtering result at the arbitrary image height Pn through the interpolation processing using the intermediate data at two image heights. Assume that as illustrated in FIG. 9B, d0 denotes a distance from the origin P0 to the arbitrary image height Pn in the image area B, and d2 denotes a distance from the image height P2 to the arbitrary image height Pn. In the step S114, F0 and F2 are the unsharp images as the filtering results using the PSFs at the image heights P0 and P2. Then, data (unsharp image) Fn at the arbitrary image height Pn is expressed as follows.

$$Fn = F0 \times (1-d0) + F2 \times d2 \quad (8)$$

This interpolation processing can generate interpolation data at an arbitrary height in each image area, and generate data of one unsharp image based on the plural pieces of unsharp image data generated in the step S114.

This interpolation processing method and the positions at the specific image heights P1, P2, and P3 configured to hold the PSF are selected based on the optical characteristic of the image pickup lens 101 as described above. This interpolation processing can generate intermediate data at an arbitrary image height in each image area. As a result, this embodiment can generate the unsharp image (referred to as an "interpolation unsharp image" hereinafter) as one intermediate data corresponding to the PSF for all image heights based on the nine unsharp images as the intermediate data generated in the step S114.

While this embodiment describes a method for interpolating an unsharp image as the interpolation processing method, the present invention may perform the interpolation processing expressed in Expression (8) for the unsharp mask and filter (convolute) the interpolated unsharp mask. Even if the interpolation processing is performed for the filtered image or even if the filtering and the interpolation processing to the pre-filtering filter are performed, the obtained results are similar and these processes are equivalent.

In this way, this embodiment can generate an interpolation unsharp image corresponding to a filtering result of an input image by an unsharp mask obtained based on different PSFs at image heights, only by storing data with a small data amount of the limited number of PSFs at the specific image heights. This method may slightly sacrifice the precision in comparison with a case where the input image is filtered with the unsharp mask obtained from the PSF for each image height by preparing the PSFs for all image heights. However, it is possible to significantly reduce a storage data amount or to accelerate the processing speed (reading speed of the memory data).

Regarding the interpolation processing in the image height direction, Expression (8) is a formula relating to the image area B in the first quadrant. Of course, interpolated intermediate data can be prepared for other quadrants or other image areas by performing similar calculations. In addition, the calculation expression used for the interpolation at the image height is not limited to Expression (8) and may use a formula of a quadrant curve. The unsharp image at a specific image height may be multiplied by a certain coefficient and weighted.

Next, in step S116, the correction signal generator 202 generates a correction signal as final correction data using the interpolation unsharp image generated in the step S115. The correction signal (correction component) in this embodiment is expressed by Expression (2), and is generated as the difference between the input image and the interpolation unsharp image.

Next, in step S117, the correction signal applier 203 applies the correction signal generated in the step S116 to the input image, and generates a target sharpened image. This embodiment applies the correction signal by adding the correction signal multiplied by m to the input image in accordance with Expression (1). This embodiment determines a value of the adjustment coefficient m based on noises in the image and the overcorrection and correction shortage in the sharpening. While Expression (1) is expressed as an addition of the first term and the second term, this is true when the adjustment coefficient m is negative and Expression (1) is expressed as a subtraction when the adjustment coefficient m is positive. However, this embodiment collectively refers to this processing as the addition, because a difference between the addition and subtraction is caused by a code of the adjustment coefficient m and they can be considered to be essentially the same.

This embodiment uses as the unsharp mask the PSF of the image pickup lens 101 in the unsharp mask processing. A sharpened image that has been precisely sharpened can be obtained even from the input image that is deteriorated by the rotationally asymmetrical PSF of the image pickup lens 101 as seen in the periphery of the input image.

This embodiment performs the interpolation processing in the image height direction after the input image is filtered with the unsharp mask. However, the interpolation processing in the image height direction may be performed for the correction signal or the sharpened image that is made by applying the correction signal to the input image. Referring now to the flowchart illustrated in FIGS. 10 and 11, a description will be given of the unsharp mask processing in these cases.

Figure 10:
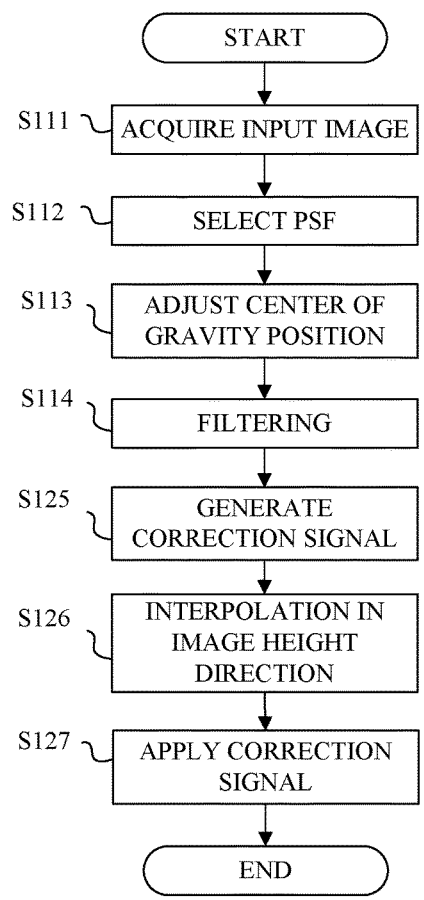
FIG. 10 is another flowchart illustrating details of the image processing according to the first embodiment.

FIG. 10 illustrates a flow of the unsharp mask processing when the interpolation processing in the image height direction is performed for the correction signal. Those steps in FIG. 10, which are corresponding steps in FIG. 7, will be designated by the same reference numerals, and a description thereof will be omitted. FIG. 10 performs steps S125 and S126 instead of the steps S115 and S116 illustrated in FIG. 7.

In step S125, the correction signal generator 202 generates a correction signal as final correction data from the unsharp image data corresponding to the PSFs at a plurality of specific image heights generated in the steps S114. Each correction signal is expressed by Expression (2), and generated by calculating a difference between the input image and the interpolation unsharp image. The correction signal is generated by the number of unsharp images generated in the step S124.

Next, in step S126, the correction signal generator 202 performs the interpolation processing in the image height direction using a plurality of correction signals generated in the step S125. The interpolation processing in the step S126 is different from the step S115 in FIG. 7 in that the correction signal is processed, but the basic processing flow is the same as that described in the step S115. The step S115 uses the PSF as the unsharp mask, and the unsharp image that is obtained by convoluting the unsharp mask with the input image is interpolated in the image height direction. On the other hand, the step S126 performs the interpolation processing for the correction signal in the image height direction as the difference between the input image and the unsharp image. In the expression, the step S115 interpolates f(x, y)*USM in Expression (2) in the image height direction whereas the step S126 interpolates h(x, y) in the image height direction. Hence, the step S126 can interpolate the correction signal in the image height direction by replacing f(x, y)*USM data in the step S115 with h(x, y).

Instead of the interpolation processing with h(x, y) as described above, interpolated h(x, y) may be generated by performing the interpolation processing and convolution processing for a curly bracket { } in h(x, y) in Expression (3).

The correction signal applier 203 applies the correction signal as correction data obtained by the interpolation processing of the correction signal, to the input image in the step S127. The application processing of the correction signal in the step S127 is the same as the step S117.

Figure 11:
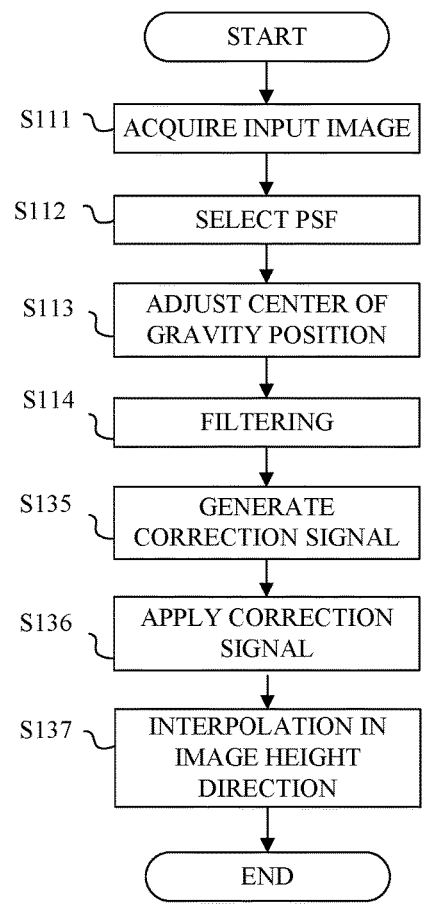
FIG. 11 is still another flowchart illustrating details of the image processing according to the first embodiment.

FIG. 11 illustrates a flow of the unsharp mask processing when the interpolation processing is performed in the image height direction for the sharpened image obtained by applying the correction signal to the input image. Those steps in FIG. 11, which are corresponding steps in FIG. 7, will be designated by the same reference numerals, and a description thereof will be omitted. FIG. 11 performs the steps S135, S136, and S137 instead of the steps S115, S116, and S117 in FIG. 7.

In the step S135, the correction signal generator 202 generates a plurality of correction signals based on the unsharp images corresponding to the PSFs at a plurality of specific image heights generated in the step S114. Each correction signal is expressed by Expression (2), and generated by a difference between the input image and the interpolation unsharp image. The correction signal is generated by the number of unsharp images generated in the step S124.

Next, in the step S136, the correction signal applier 203 applies a plurality of correction signals generated in the step S134 to the input image, and generates the sharpened image as plural pieces of intermediate data. Herein, the sharpened image is generated by applying each correction signal to the input image in accordance with Expression (1).

Next, in the step S137, the correction signal applier 203 performs the interpolation processing in the image height direction using a plurality of sharpened images generated in the step S136, and generates the target sharpened image. The interpolation processing performed in the step S137 is different from S115 in FIG. 7 in that the sharpened image is processed, but the basic processing flow is the same between the step S115 and the step S126 in FIG. 10. When the step S126 is compared with the step S137, the step S126 interpolates h(x, y) in Expression (1) in the image height direction and the step S137 interpolates g(x, y) in the image height direction. Hence, the step S137 can interpolate the sharpened image in the image height direction by replacing data of h(x, y) in the step S126 with g(x, y). Instead of performing the interpolation processing for g(x, y), the interpolated g(x, y) may be generated by performing the interpolation processing for a curly bracket in g(x, y) in Expression (7) and by performing convolution processing for f(x, y).

This embodiment performs precise sharpening processing (unsharp mask processing) corresponding to a change of an image height of the optical characteristic (PSF) through the interpolation processing in the image height direction using the PSF data at the specific image height, while maintaining small a storage data amount.

Figure 20:
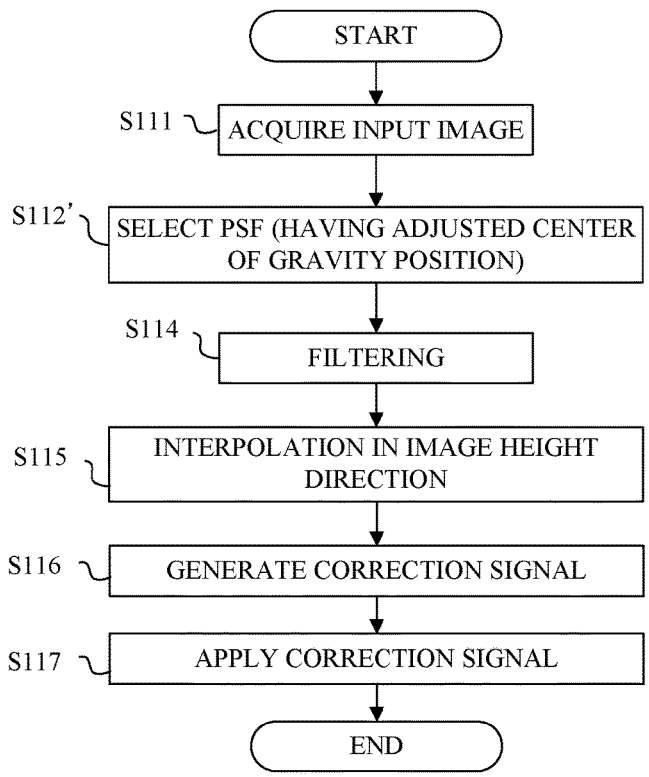
FIG. 20 is a still another flowchart illustrating details of image processing according to the first embodiment.

While this embodiment performs the sharpening processing using the filter having the adjusted center of gravity position as the unsharp mask, the center of gravity position may not necessarily be adjusted in the sharpening processing unlike FIG. 2. For example, the memory 109 may store the PSF in which the center of gravity position is previously adjusted. In this case, the image pickup apparatus does not need the center-of-gravity position adjuster 204 illustrated in FIG. 1. Otherwise, the image pickup apparatus has the same structure as that illustrated in FIG. 1. In using the PSF stored in the memory 109 in which the center of gravity position is previously adjusted, the filter generating processing may use the processing illustrated in FIG. 20 may be performed that omits the adjustment of the center of gravity position of the step S113 in the processing illustrated in FIG. 7. Those steps in FIG. 20, which are corresponding steps in FIG. 7, will be designated by the same reference numerals, and a description thereof will be omitted. Since the center of gravity has been already adjusted when the step S112' selects the PSF, the step S114 may provide filtering using the selected PSF.

While this embodiment adjusts the center of gravity position, similar effects can be obtained by adjusting the peak position as described above. Moreover, in adjusting the unsharp mask with the peak position, the position at which the ideal point image δ(x, y)=1 in Expressions (3), (6), and (7) accords with the peak position of the unsharp mask. This accordance minimizes the positive value of the filter coefficient of the filter expressed by the curly bracket { } in Expression (7) or the absolute value of the sum of the negative filter coefficient values. The Unsharp mask USM(x, y)≥0 and the maximum value of USM(x, y) is cancelled by δ(x, y)=1 in (δ(x, y)−USM(x, y)). Thus, the absolute value of each filter coefficient is entirely reduced and the problem of undershoot, etc. is less likely to occur in the sharpening processing.

As described above, Expression (7) is equivalent with Expressions (5) and (6), and thus the problem reducing effect due to the adjustment of the peak position of the filter is established with other correcting expressions.

Thus, the number of sharpening processing steps can be reduced by previously adjusting the center of gravity position or the peak position of the PSF. This is also applied to the following second and third embodiments.

Second Embodiment

Next follows a description of an image pickup apparatus according to a second embodiment of the present invention. The image pickup apparatus according to this embodiment is different from that according to the first embodiment in image processing (unsharp mask processing), and the image pickup apparatus has the same structure as that of the image pickup apparatus according to the first embodiment. Thus, a description of the structure of the image pickup apparatus according to this embodiment will be omitted.

Figure 12:
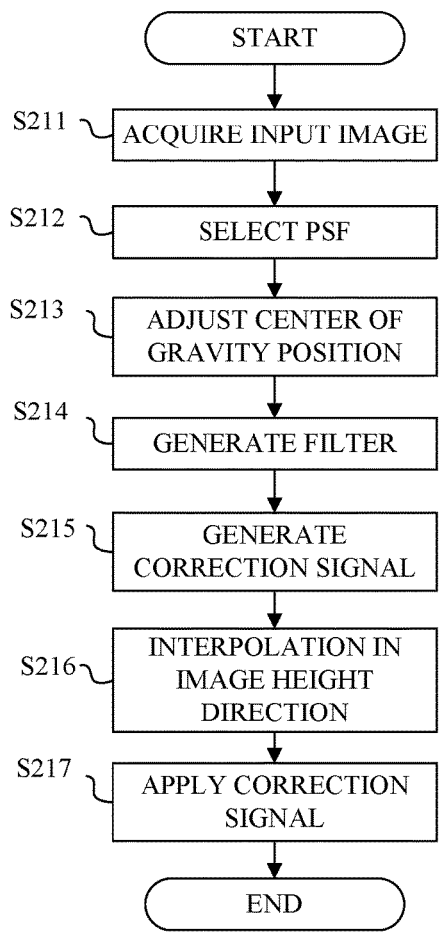
FIG. 12 is a flowchart illustrating details of image processing according to a second embodiment.

The flowchart in FIG. 12 illustrates a flow of unsharp mask processing according to this embodiment. In this embodiment, the image processor 104 that has received a command from the system controller 106 also performs this processing in accordance with the image processing program.

This embodiment is different from the first embodiment in the generating method of the correcting signal. More specifically, the first embodiment generates a correction signal based on Expression (2) whereas this embodiment generates the correction signal based on Expression (3). The steps S211 and S212 are similar to the steps S111 and S112 in the first embodiment (in FIGS. 7, 10, and 11), and a description thereof will be omitted.

In step S213, the center-of-gravity position adjuster 204 adjusts the center of gravity position for the PSF at the specific image height obtained in the step S212 in accordance with the method illustrated in FIG. 15 according to the first embodiment.

Next, in step S214, the correction signal generator 202 calculates the difference between the ideal point image and the PSF at the specific image height having the center of gravity position adjusted in the S213, and generates a plurality of filters.

Next, in step S215, the correction signal generator 202 convolutes the plurality of filters generated in the step S214 with the input image, and generates a plurality of correction signals.

Next, in step S216, the correction signal generator 202 performs interpolation processing of the correction signal in the image height direction using the plurality of correction signals generated in the step S215. The processing in the steps S216 and S217 is the same as the processing in the steps S126 and S127 in FIG. 10, and a description thereof will be omitted. The above processing can realize the unsharp mask processing in accordance with Expression (6).

The interpolation processing in the image height direction may be performed for the correction signal or the sharpened image that is made by applying the correction signal to the image signal.

Third Embodiment

Next follows a description of an image pickup apparatus according to a third embodiment of the present invention. The image pickup apparatus according to this embodiment is different from that according to the first embodiment in image processing (unsharp mask processing), and the image pickup apparatus has the same structure as that of the image pickup apparatus according to the first embodiment. Thus, a description of the structure of the image pickup apparatus according to this embodiment will be omitted.

Figure 13:
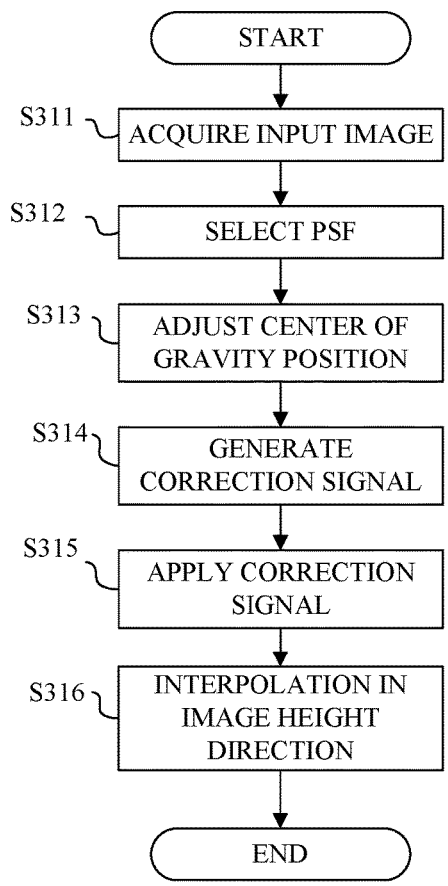
FIG. 13 is a flowchart illustrating details of image processing according to a third embodiment.

The flowchart in FIG. 13 illustrates a flow of unsharp mask processing according to this embodiment. In this embodiment, the image processor 104 that has received a command from the system controller 106 also performs this processing in accordance with the image processing program.

This embodiment is different from the first and second embodiments in the generating method of the correcting signal and in the applying method of the correction signal to the input image. More specifically, this embodiment generates a correction signal based on Expression (7), and applies this correction signal to the input image. Thus, in the flowchart in FIG. 13, the steps S314 (generation of the correction signal) and S315 (application of the correction signal) are different from those in the first and second embodiments. The step S313 adjusts the center of gravity position in accordance with the method illustrated in FIG. 18 similar to the first embodiment.

In the step S314, the center-of-gravity position generator 202 generates a plurality of filters (correction signals) corresponding to part in the curly bracket in Expression (7) using the unsharp mask (PSF) at the specific image height having the center of gravity adjusted by the step S313. In this embodiment, the correction signal generated by the correction signal generator 202 is equivalent with the filter.

Next, in the step S315, the correction signal applier 203 convolutes each of a plurality of filters generated in the step S314 with the input image, and generates a sharpened image as a plurality of intermediate data. Thus, this embodiment once convolutes the filter generated using the PSF as the unsharp mask, with the input image, and generates a sharpened image.

Next, in the step S316, the correction signal applier 203 performs interpolation processing in the image height direction using the plurality of sharpened images generated in the step S315, similar to the step S137 in FIG. 11, and generates the target sharpened image.

The above processing can realize the unsharp mask processing in accordance with Expression (7).

While each of the above embodiments incorporates the image processor 104 as the image processing apparatus into the image pickup apparatus, the image processing apparatus may be configured as an apparatus, such as a personal computer, separate from the image pickup apparatus. In this case, the image processing apparatus obtains as an input image a captured image obtained in the image pickup apparatus via a communication, such as the Internet and a LAN, and a recording medium, such as a semiconductor memory, and performs unsharp mask processing for the input image.

Each of the above embodiments can provide highly precise sharpening processing using the filter properly adjusted to the asymmetrical PSF of the optical system.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-102100, filed May 19, 2015 which is hereby incorporated by reference herein in its entirety.

What is claimed is:

1. An image processing apparatus comprising:
   at least one processor or circuit configured to:
   acquire an input image generated by image pickup via an optical system; and
   perform unsharp mask processing for the input image using a filter generated based on information of a point spread function of the optical system corresponding to an image pickup condition of the optical system in generating the input image,
   wherein the filter is generated based on an unsharp mask used for the unsharp mask processing, and includes two-dimensional data having filter coefficients that are arranged rotationally asymmetrically with respect to a filter coefficient corresponding to a target pixel in the input image in convoluting the filter with the input image, and
   wherein a peak position or a center of gravity position of the unsharp mask accords with a position in the filter of the filter coefficient corresponding to the target pixel.

2. The image processing apparatus according to claim 1, wherein the filter coefficient corresponding to the target pixel has a positive value.

3. The image processing apparatus according to claim 1, wherein the unsharp mask satisfies the following condition:

$$j-\sigma < c < j+\sigma$$

where f(i) is an i-th coefficient of the unsharp mask on one section that passes a coefficient of the unsharp mask corresponding to the target pixel, j is a peak position or a center of gravity position of coefficients of the unsharp mask, N is a tap number of the unsharp mask, c is a center position of the unsharp mask on the section, and σ is defined as the following equation $$\sigma = \sqrt{\sum_{i=1}^{N}\{(i-j)^2 \times f(i)\} \Big/ \sum_{i=1}^{N} f(i)}.$$

4. The image processing apparatus according to claim 1, wherein the peak position or center of gravity position of the unsharp mask accords with a center position in the filter.

5. The image processing apparatus according to claim 1, wherein the peak position or center of gravity position of the unsharp mask does not accord with a center position in the filter.

6. The image processing apparatus according to claim 1, wherein the processor generates an unsharp image by convoluting the unsharp mask with the input image, and generates a sharpened image by adding to the input image correction data generated using a difference between the input image and the unsharp image.

7. The image processing apparatus according to claim 1, wherein the processor generates the filter using a difference between an ideal image and the point spread function of the optical system, generates correction data by convoluting the filter with the input image, and generates a sharpened image by adding the correction data to the input image.

8. The image processing apparatus according to claim 1, wherein the processor generates the filter by adjusting a difference between an ideal image and the point spread function of the optical system using an adjustment coefficient that depends on a position of the input image and by adding the adjusted difference to the ideal point image, and generates a sharpened image by convoluting the filter with the input image.

9. An image pickup apparatus comprising:
   an image pickup unit configured to perform image pickup via an optical system; and
   an image processing apparatus configured to perform correction processing for an input image acquired by the image pickup unit,
   wherein the image processing apparatus includes at least one processor or circuit configured to:
   acquire the input image; and
   perform unsharp mask processing for the input image using a filter generated based on information of a point spread function of the optical system corresponding to an image pickup condition of the optical system in generating the input image,
   wherein the filter is generated based on an unsharp mask used for the unsharp mask processing, and includes two-dimensional data having filter coefficients that are arranged rotationally asymmetrically with respect to a filter coefficient corresponding to a target pixel in the input image in convoluting the filter with the input image, and
   wherein a peak position or a center of gravity position of the unsharp mask accords with a position in the filter of the filter coefficient corresponding to the target pixel.

10. An image processing method comprising the steps of:
    acquiring an input image generated by image pickup via an optical system; and
    performing unsharp mask processing for the input image using a filter generated based on information of a point spread function of the optical system corresponding to an image pickup condition of the optical system in generating the input image, wherein the filter is generated based on an unsharp mask used for the unsharp mask processing, and includes two-dimensional data having filter coefficients that are arranged rotationally asymmetrically with respect to a filter coefficient corresponding to a target pixel in the input image in convoluting the filter with the input image, and wherein a peak position or a center of gravity position of the unsharp mask accords with a position in the filter of the filter coefficient corresponding to the target pixel.

11. A non-transitory computer-readable storage medium configured to store a computer program that enables a computer to execute image processing to an input image generated by image pickup via an optical system, wherein the image processing includes the steps of:

acquiring an input image generated by image pickup via an optical system; and performing unsharp mask processing for the input image using a filter generated based on information of a point spread function of the optical system corresponding to an image pickup condition of the optical system in generating the input image, wherein the filter is generated based on an unsharp mask used for the unsharp mask processing, and includes two-dimensional data having filter coefficients that are arranged rotationally asymmetrically with respect to a filter coefficient corresponding to a target pixel in the input image in convoluting the filter with the input image, and wherein a peak position or a center of gravity position of the unsharp mask accords with a position in the filter of the filter coefficient corresponding to the target pixel.

* * * * *